JOHN SCUDERI
INVENTOR.

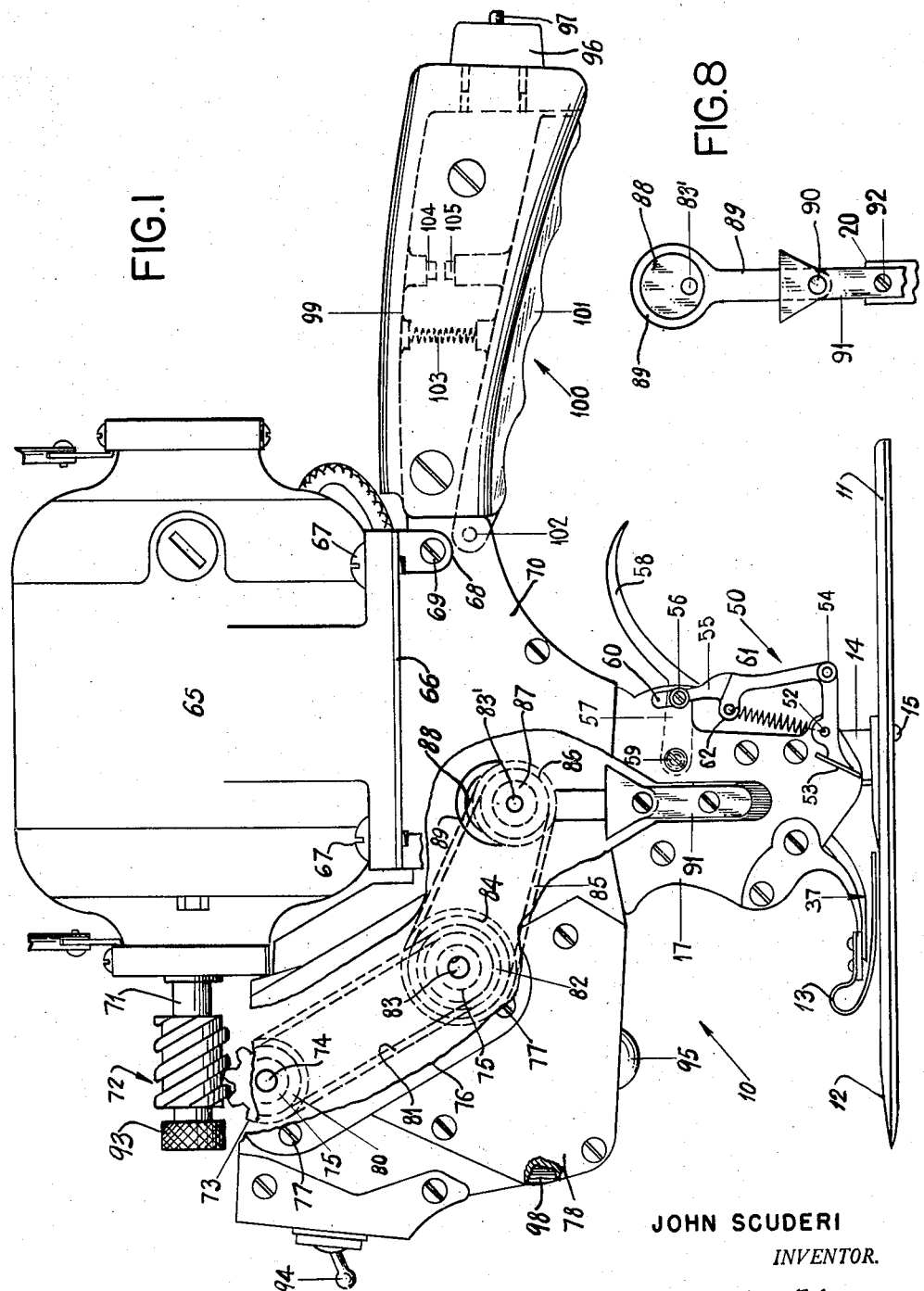
March 17, 1959    J. SCUDERI    2,877,550
PAPER PATTERN CUTTING MACHINE
Filed July 16, 1958    3 Sheets-Sheet 1
JOHN SCUDERI
INVENTOR.
BY Joseph Blacker
ATTORNEY March 17, 1959  J. SCUDERI  2,877,550
PAPER PATTERN CUTTING MACHINE
Filed July 16, 1958  3 Sheets-Sheet 2

BY Joseph Blacker
ATTORNEY

March 17, 1959   J. SCUDERI   2,877,550
PAPER PATTERN CUTTING MACHINE
Filed July 16, 1958   3 Sheets-Sheet 3

JOHN SCUDERI
INVENTOR.

BY *Joseph Blacker*

ATTORNEY

United States Patent Office 2,877,550
Patented Mar. 17, 1959

2,877,550

PAPER PATTERN CUTTING MACHINE

John Scuderi, Brooklyn, N. Y., assignor to Eastman Machine Company, Buffalo, N. Y.

Application July 16, 1958, Serial No. 749,579

5 Claims. (Cl. 30—228)

In the art of cutting paper patterns for use in cutting garment fabrics, it has been customary to employ scissors. Since the paper of which these patterns is made is relatively thick, the cutting operations were heretofore done in a crude manner which is also slow, tedious and tiring on the hands of persons doing the cutting.

It is consequently an object of this invention to provide a power driven, portable pattern cutter having a vertically reciprocable cutter movable to and through a base plate, whereby a groove-like cut of considerable width is formed in the pattern paper in step by step manner.

Another object is to provide a portable, electrically-operated, paper pattern cutting machine having a flat base plate to permit easy maneuverability of the cutting machine on a table or other support below the pattern paper.

Another object is to provide an open channel in the rear and lower portion of the base plate to permit the paper cuttings to fall from the cutting plate into this channel and to prevent clogging of the blade.

Another object is to provide a machine of this kind with two cooperating cutting blades formed to cut a channel in the pattern paper in a step by step manner.

Another object is to form the lower portion of the reciprocal cutting blade with an upright heel which is in contacting relation with a stationary cutting blade at all times, the heel being positioned at the rear of an upwardly inclined cutting edge and serving to clear the machine of the cuttings.

Another object is to provide an upright supporting column which forms a rigid connection between the base plate and the motor and other parts of the cutting machine.

A further object is to provide a direction indicating guide on the base plate and secured in front of the supporting plate and cutting blade.

A further object is to provide a manually operable notch gage which serves to limit the depth to which the machine may cut a notch in the pattern.

Referring to the drawings, which show by way of example one embodiment of my invention:

Fig. 1 is a side elevation of a cutting machine embodying this invention.

Fig. 7 also shows a notch made by the pattern cutting machine.

Fig. 8 is a front view of a fragmentary portion of drive mechanism for the movable blade.

Figure 3:
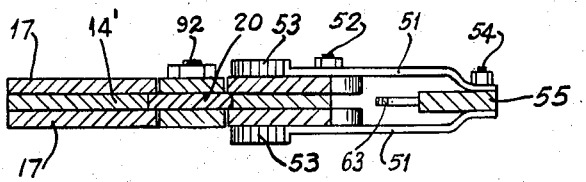
Fig. 3 is a cross-sectional view taken on line 3—3 in Fig. 2.
Figure 4:
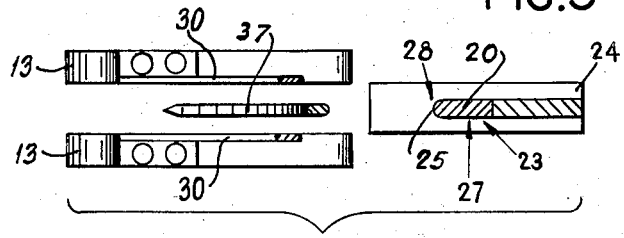
Fig. 4 is a cross-sectional view taken on line 4—4 in Fig. 2.
Figure 2:
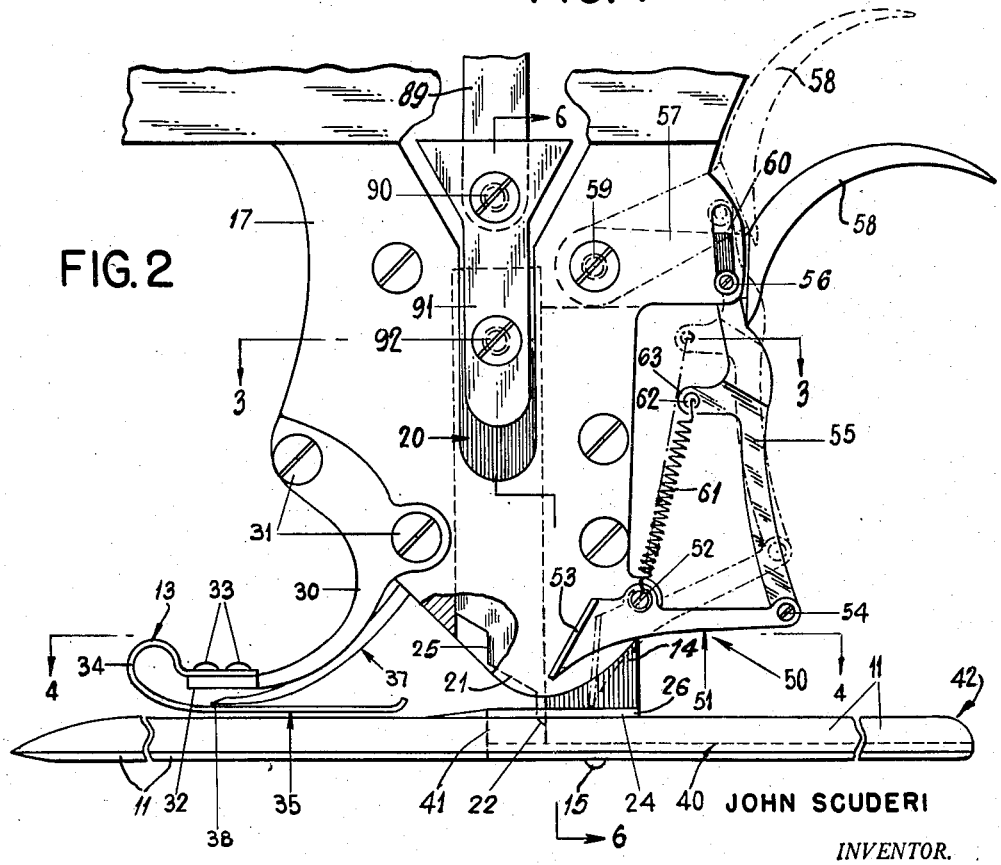
Fig. 2 is a side elevation thereof on an enlarged scale of the cutting and guiding lower portion of the cutting machine, partly broken away to show the rounded lower portion of the movable blade, and also showing the operating position of a notch gauge.

In the illustrated embodiment of the invention, the numeral 10 indicates a paper pattern cutting machine used for cutting garment patterns and the like, and comprises an elongated flat base plate 11 of generally rectangular form and tapering downwardly at the front 12. The paper pattern cutting machine is moved by the operator along a cutting table and the front 12 of the base plate 11 lifts the pattern paper to the upper surface of the base plate and beneath two presser feet 13.

From the base plate 11 rises an upright supporting plate 14 which is integral with the base plate. Rollers 15 are suitably mounted at substantially the middle of the lengthwise extent of the base plate and partly extend below the base plate and permit easy maneuverability of the cutting machine around curves forming the design on the pattern paper.

Two side plates 17 are suitably secured to the supporting plate 14 and have upright slots 18. A movable male cutting blade 20 of adjacent rectangular cross-section is slidably mounted in the slot 19 of the supporting plate 14.

The movable blade 20 has a sloping cutting edge 21 at its lower end. The edge 21 terminates in a heel portiton 22 which is at all times in contact with a stationary, female cutting blade 24. The blade 20 is partly cut away to provide a rounded cutting edge 25 at the front portion of the blade.

The movable blade 20 moves (about ¼" stroke) vertically up and down in a guideway between the two parallel, vertical side plates 17 which are spaced apart a distance equal to the thickness of the intermediary supporting plate 14. The guideway is also defined by the supporting plate 14 at the rear end by a filler plate 14' between the side plates 17 in front of the knife 20. The guideway provides a clearance passage for the movable cutting blade.

The stationary blade 24 extends above the base plate 11 at its rear end 26 and merges into the base plate at its front edge portion.

The cutting edges of the stationary blade comprises an upright channel 27 of generally rectangular cross-section to receive the movable blade and has a rounded edge surface 28 at its front end corresponding to the rounded cutting edge 25 at the front of the movable blade.

Each presser foot 13 has a convex, plate-like carrier 30 which is fastened by screws 31 to the front portion of a side plate 17. The lower portion of each carrier has a horizontal extension 32 and two rivets 33 which secure the curved, front spring portion 34 of the presser-foot 13 to its respective side plate 17. The curved front spring portion 34 terminates in a horizontal extension 35 which is slightly raised above the base plate 11 and is in resilient engagement with the pattern paper.

A direction pointer or guide 37 is mounted intermediate the presser-feet 13, 13 and has its front edge 38 positioned a considerable distance rearward of the front edge portions of the presser feet. The bottom surface of the guide is curved upwardly to permit the pattern paper to pass freely backward and forward.

The direction pointer 37 is supported by the side plates 17 in alignment with the supporting plate 14 and is mounted intermediate the presser feet. The direction pointer 37 enables the operator to follow curves on the pattern paper with accuracy.

An outlet channel 40 is formed in the lower portion of the base plate 11. The outlet channel starts at the front face 41 of the movable cutting blade 20 and terminates at the rear end portion 42 of the base plate 11.

The upper portion of the base 11 above the outlet channel 40 is formed with slightly tapering side walls 43 to permit the cuttings to freely fall through and out of the channel 40. The tapering side walls 43 form continuations of the cutting walls in the female cutting member 24.

In operation, the operator moves the cutting machine along the markings on the pattern paper 44 which is held down by sharp pointed elements, similar to thumb tacks, but each having a gripping head to permit pulling out of the table with ease.

Figure 7:
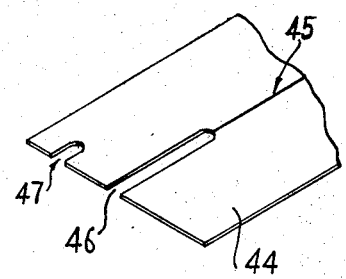
Fig. 7 is a perspective view of a piece of pattern paper showing a through linear opening formed therein with the paper pattern cutting machine.
Figure 6:
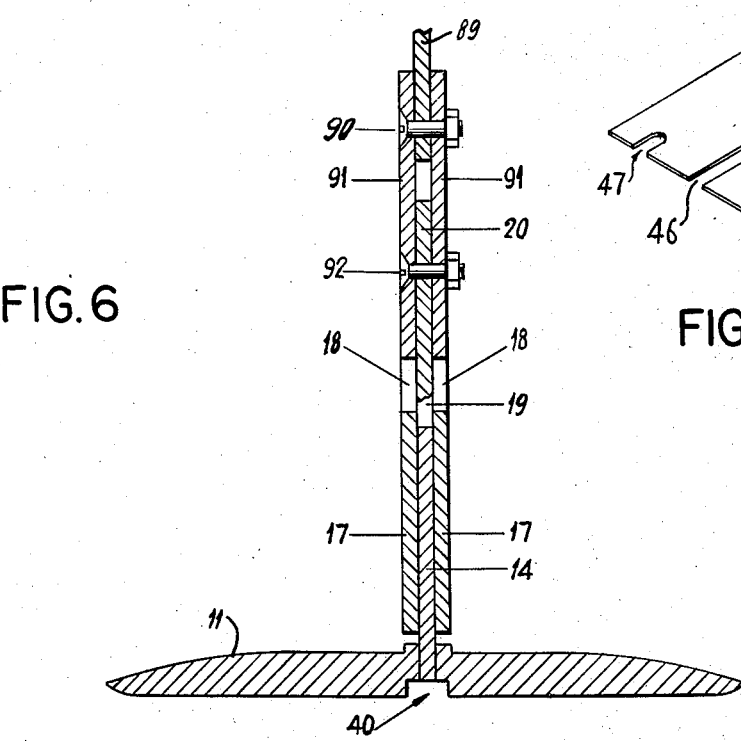
Fig. 6 is a cross-sectional view taken on line 6—6 in Fig. 2.
Figure 5:
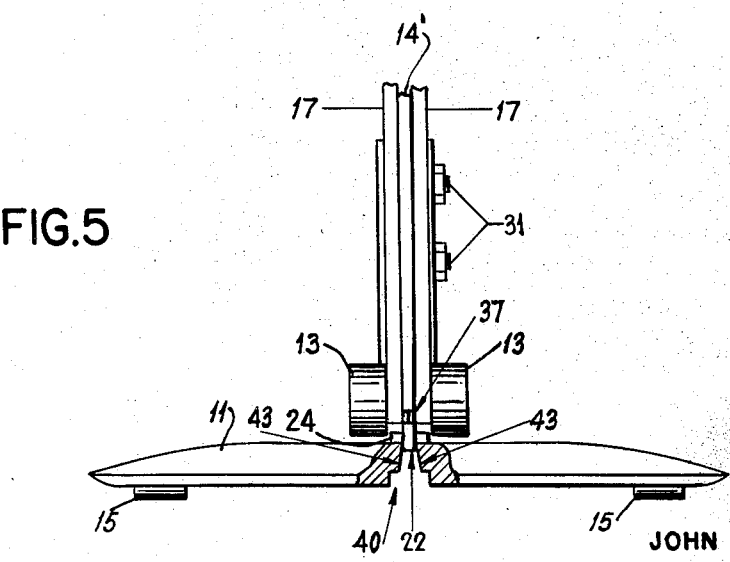
Fig. 5 is a front view, on an enlarged scale, of the cutting and guiding mechanism shown in Fig. 2, broken away to show an outlet channel.

As shown in Fig. 7, the pattern paper 44 has a line 45 indicating the pencil marking which the machine must follow. The machine forms a groove-like channel 46 about one-sixteenth of an inch in width.

Fig. 7 also shows a notch 47 of limited depth cut in the paper 44. Notches are cut in the side edges of the pattern paper to indicate the alignment of seams, etc.

To facilitate the formation of notches 47 by the cutting machine 10, I provide a manually operable notch gauge 50 comprising a pivotally mounted assembly made up of a bifurcated lever 51 pivotally mounted on a fulcrum 52 on the side plates 17 adjacent the base plate 11, at the rear of the cutting blades 20 and 24. At the free end of the lever 51 are two laterally bent, plate-like portions 53, one on each face of the side plates 17.

At the free end of the lever 51 is a pivot pin 54 passing through a bifurcated portion of the lever 51. A link 55 is pivotally mounted on the pin 54 at its lower end and is pivotally mounted on a pin 56 at its upper end. The pin 56 passes through a horizontal extension 57 of a hand lever 58. The lever 58 is pivotally mounted on a pivot screw 59. It is to be noted that in order to permit the pin 56 to move up and down, I have provided openings 60 in each side plate 17.

A coil spring 61 is secured at its lower end to the fulcrum 52 and at its upper end to an apertured portion 62 of an extension 63 of the link 55.

The operator may, by raising the free end portion of the lever 58, raise the link 55 and cause the lateral plate portions 53 to move to substantially vertical position to control the depth of notch cuttings.

The depth of an individual notch is controlled by the distance from the front face of the movable blade 20 to the lateral plate portions 53 of the notch gauge 50.

The cross-section of the movable cutting blade is that of a rectangle so as to cut out a notch having considerable width, as distinguished from a shear cut produced by shear blades or scissors.

Under normal operating conditions, the coil spring 61 automatically raises the notch gauge 50 out of the way, permitting the operator to continue cutting farther along the pencil-marked line 45 on the pattern paper 44, to the desired distance on the pattern paper.

An electric motor 65 is mounted on angles 66 by screws 67. The lower legs 68 of the angles 66 are fastened by screws 69 to housing plates 70. The motor 65 has a shaft 71 which carries a worm 72 in meshed engagement with a worm gear 73. The worm gear 73 is rotatably mounted on a shaft 74 supported in an upper bearing 75 in a cover plate 76 which is secured by screws 77 to an extended side plate 78 of the housing plates 70.

Mounted on the shaft 74 in front of the worm gear 73 is a sprocket gear 80 having a sprocket chain 81 which is in meshed engagement with a sprocket gear 82 mounted on a shaft 83 in a lower bearing 75 in the cover plate 76.

Mounted on the shaft 83 rearward of the sprocket gear 82 is a further sprocket gear 84, preferably of larger diameter than the sprocket gear 82. The sprocket gear 84 has a sprocket chain 85 which is in meshed engagement with a sprocket gear 86 mounted on a shaft 83' which is suitably mounted in a bearing 87.

Secured to the shaft 83' rearward of the sprocket gear 86 is an eccentric 88 having a pitman 89. The lower end of the pitman 89 has a pivot screw 90 on which are mounted two carrier plates 91. At the lower portion of each carrier plate 91 is a pivot screw 92 passing through the movable blade 20. The eccentric 88 actuates the pitman 89, the carrier plates 91 and the movable blade 20 up and down in relation to the stationary blade 24.

It is to be noted that the heel 22 of the movable blade 20 is the means which brings the cuttings out of the outlet channel 40 and prevents clogging of the machine.

It is also to be noted that the free end of the motor shaft 71 has a knurled end collar 93 to facilitate manual adjustment of the movable blade.

As shown in Fig. 1, an electric light switch 94 is mounted at one end of the machine, above the extended side plates 78. The switch is suitably connected by an electric conducting wire to an electric lamp 95 mounted at the lower surface of and between the plates 78. The lamp 95 serves to illuminate the front surface of the machine whereby the operator can see clearly the operating parts.

An outlet plug 96 is connected to an electric conducting wire 97 and leads to a source of current and supplies current to the machine 10.

It is also to be noted that the front portion of the housing 70 is made up of two extended side plates 78 which are considerably spaced apart to house the lamp 95 and between which are spacing plates 98.

As shown in Fig. 1, I provide an electric switch for intermittently actuating the motor. I provide a handle 99 to one end of which the electric plug 96 is connected. The switch comprises an arm 101 which is pivotally mounted on a pin 102 and actuated by a coil spring 103 to bring two electric contacts 104 and 105 into inoperative position. The switch 100 may be manually actuated to cause the machine 10 to operate intermittently as required, by pressing the switch arm 101 inwardly of the handle.

In accordance with the patent statutes I have described and illustrated the preferred embodiment of my invention, but it will be understood that various changes and modifications can be made therein without departing from the spirit of the invention as defined by the appended claims.

I claim:

1. A pattern cutting machine for cutting wide groove-like linear openings in pattern paper, comprising an elongated base plate having a linear channel extending to the lower face of said base plate, an upright supporting plate extending upwardly from said base plate, two side plates secured to said supporting plate and having upright slots therethrough and a guideway therebetween, a movable blade of rectangular cross-section slidably mounted in said guideway, an eccentric mounted above said movable blade and having a pitman depending therefrom, means connecting said pitman with said movable blade, an electric motor, and means connecting said motor with said eccentric for actuation of said movable blade.

2. A pattern cutting machine for cutting a wide groove-like linear opening in pattern paper, comprising a base plate having a linear channel extending to the lower face of said base plate, a supporting plate extending upwardly from said base plate, two side plates secured to said supporting plate and having upright slots therethrough, and a guideway therebetween, a movable blade of recatngular cross-section slidably mounted in said guideway, said supporting plate slot being wider than said side plate slots to cause said movable blade to be held in supported relation by said side plates, an eccentric mounted above said movable blade and having a pitman depending therefrom, means connecting said pitman with said movable blade, an electric motor, and means connecting said motor with said eccentric for actuation of said movable blade.

3. A portable pattern cutting machine for cutting a groove-like linear opening in a pattern paper, comprising a base plate having a linear outlet channel extending to the lower face of said base plate and terminating at the rear end of said base plate, a supporting plate extending upwardly from said base plate, two side plates secured to said supporting plate and having upright slots therethrough, and a guideway therebetween, a movable blade of rectangular cross-section slidably mounted in said guideway, an eccentric mounted above said movable blade and having a pitman depending therefrom, means connecting said pitman with said movable blade, an electric motor, and means connecting said motor with said eccentric for actuation of said movable blade.

4. A portable pattern cutting machine for cutting a groove-like linear opening in a pattern paper, comprising movable and stationary blades and a base plate having a linear channel starting at the front face of said movable blade, extending to the lower face of said base plate and terminating at the rear end of said base plate, a supporting plate extending upwardly from said base plate, two side plates secured to said supporting plate and having a guideway therebetween, a movable blade of rectangular cross-section slidably mounted in said guideway, a direction pointer supported by said side plates above said base plate and intermediate said side plates, a presser foot mounted on each side of said direction pointer, an eccentric mounted above said movable blade and having a pitman depending therefrom, means connecting said pitman with said movable blade, an electric motor, and means connecting said motor shaft with said eccentric for actuating of said movable blade in coacting relation with said stationary blade.

5. A portable pattern cutting machine for cutting a groove-like linear opening in a pattern paper, comprising movable and stationary blades and a base plate having a linear channel starting at the front face of said movable blade and terminating at the rear end of said base plate, a supporting plate extending upwardly from said base plate, a direction pointer supported above said base plate, a foot mounted on each side of said direction pointer, an eccentric mounted above said movable blade and having a pitman depending therefrom, a vertically movable carrier plate secured to said movable blade and being pivotally connected at its upper end to said pitman, means for securing a motor to said supporting plate, and means connecting said motor shaft with said eccentric for actuating said movable blade in coacting relation with said stationary blade.

No references cited.